United States Patent [19]
Nayebi et al.

[11] Patent Number: 5,926,063
[45] Date of Patent: Jul. 20, 1999

[54] METHOD OF AND APPARATUS FOR SELECTIVELY ENGAGING AN INTERNAL TRAP FILTER AND IMPLEMENTING AN EXTERNAL TRAP FILTER THROUGH A SINGLE PIN

[75] Inventors: Mehrdad Nayebi, Palo Alto; Duc Ngo, San Jose, both of Calif.

[73] Assignees: Sony Corporation, Tokyo, Japan; Sony Electronics, Inc., Park Ridge, N.J.

[21] Appl. No.: 08/852,919

[22] Filed: May 8, 1997

[51] Int. Cl.⁶ .............................. H03K 5/00; H03H 11/04
[52] U.S. Cl. ........................... 327/553; 327/552; 327/556
[58] Field of Search ................................... 327/552, 551, 327/553, 77, 556, 99

[56] References Cited

U.S. PATENT DOCUMENTS

| | | | |
|---|---|---|---|
| 3,820,157 | 6/1974 | Pritchard et al. | 358/30 |
| 3,932,819 | 1/1976 | Spencer | 328/167 |
| 3,963,992 | 6/1976 | Hekimian et al. | 327/332 |
| 4,077,047 | 2/1978 | Yamagiwa | 358/4 |
| 4,101,927 | 7/1978 | Isono et al. | 358/27 |
| 4,157,565 | 6/1979 | Kuniyoshi et al. | 358/8 |
| 4,163,253 | 7/1979 | Morio et al. | 358/120 |
| 4,163,989 | 8/1979 | Akazawa et al. | 358/27 |
| 4,165,524 | 8/1979 | Ninomiya | 360/36 |
| 4,238,852 | 12/1980 | Iga et al. | 371/40 |
| 4,287,529 | 9/1981 | Tatami et al. | 358/8 |
| 4,382,198 | 5/1983 | Ishijima et al. | 327/331 |
| 4,700,239 | 10/1987 | Yoshinaka et al. | 358/310 |
| 4,748,628 | 5/1988 | Moriwaki | 371/40 |
| 4,924,115 | 5/1990 | Yazdy | 327/552 |
| 4,930,004 | 5/1990 | Yamamoto et al. | 358/29 |
| 5,032,915 | 7/1991 | Ichimura | 358/166 |

FOREIGN PATENT DOCUMENTS

| | | | |
|---|---|---|---|
| 60-206394 | 10/1985 | Japan | H04N 9/00 |
| 04115689 | 4/1992 | Japan | H04N 9/78 |
| 04235491 | 8/1992 | Japan | H04N 9/78 |

*Primary Examiner*—Dinh Le
*Attorney, Agent, or Firm*—Haverstock & Owens LLP

[57] ABSTRACT

A method of and apparatus for selectively engaging an internal trap filter and implementing an external trap filter through a single pin routes a separate luminance signal through the pin or through an internal trap filter based on the logical voltage level at the pin. When implementing an external trap filter the external components comprising the filter are coupled between the pin and ground and a voltage level of the pin is maintained at a logical low voltage level. When the pin is at a logical low voltage level, two path switches are closed and the separate luminance signal is routed through the pin to be filtered by the external trap filter. The internal trap filter is engaged by coupling a precision resistor between the pin and a power supply voltage thereby pulling the voltage level of the pin to a logical high voltage level and opening the two path switches to bypass the pin and route the separate luminance signal through an internal trap filter. When the voltage level of the pin is at a logical high voltage level, a bias switch is closed thereby providing a bias current, created from the voltage drop across the precision resistor, to the internal trap filter. The internal trap filter is activated by the bias current and filters the separate luminance signal according to the value of the bias current, before the separate luminance signal is combined with the separate chrominance signal. The value of the bias current is controlled by the value of the precision resistor.

28 Claims, 7 Drawing Sheets

METHOD OF AND APPARATUS FOR SELECTIVELY ENGAGING AN INTERNAL TRAP FILTER AND IMPLEMENTING AN EXTERNAL TRAP FILTER THROUGH A SINGLE PIN

FIELD OF THE INVENTION

The present invention relates to the field of selectively filtering video signals. More particularly, the present invention relates to the field of selectively utilizing a trap filter to filter a separate luminance video signal.

BACKGROUND OF THE INVENTION

A composite color video signal includes horizontal synchronizing signals, a burst signal superimposed onto the pedestal level at the back porch of the horizontal synchronizing signal and a video information signal. The video information signal comprises a chrominance subcarrier having different phases amplitude-modulated with chrominance information. The composite color video signal includes both luminance and chrominance information. The burst signal has a burst signal frequency equal to 3.58 MHz, which is the frequency of the chrominance subcarrier $f_{sc}$. The video signal can also be separated into a separate chrominance or C signal and separate luminance or Y signal. A mixer circuit can be used to combine the separate chrominance or C signal with the separate luminance or Y signal to thereby form a composite video signal.

In video circuits, it is sometimes necessary to implement a trap, or filter, to remove unwanted frequencies from the luminance signal which would interfere with the chrominance signal to prevent problems in a video signal such as cross coloring. Previously, trap filters have been implemented using external components, such as an inductor and capacitor (LC) filter, coupled to a pin of an integrated circuit. The separate luminance signal is then routed to flow through the pin and is filtered by the external LC filter, thereby allowing circuit and system designers the ability to implement the filter with precision external components appropriate for specific systems and desired values. Such an external LC trap filter is illustrated in FIG. 1. The separate luminance signal Y is coupled internally to a pin 10. The pin 10 is coupled to a mixer 16 which also receives the separate chrominance signal C. The mixer 16 combines the separate luminance signal Y and the separate chrominance signal C, thereby forming a composite video signal CV. To filter the unwanted frequencies from the separate luminance signal Y before it is combined with the separate chrominance signal C, an external trap filter 18 is coupled to the pin 10. The external trap filter 18 includes a capacitor 12 and an inductor 14 which together form an LC filter used to filter the unwanted frequencies from the separate luminance signal Y.

The implementation of such an external trap filter including an external capacitor and an external inductor is relatively expensive due to the cost of the required external components. The external components also take up valuable space on a printed circuit board or within a system. What is needed is an internal trap filter which can be selectively engaged and does not require an external inductor and capacitor. What is further needed is a circuit which allows a single pin to be used to selectively access an internal trap filter or to implement an external trap filter.

SUMMARY OF THE INVENTION

A method of and apparatus for selectively engaging an internal trap filter and implementing an external trap filter through a single pin routes a separate luminance signal through the pin or through an internal trap filter based on the logical voltage level at the pin. When implementing an external trap filter the external components comprising the filter are coupled between the pin and ground and a voltage level of the pin is maintained at a logical low voltage level. When the pin is at a logical low voltage level, two path switches are closed and the separate luminance signal is routed through the pin to be filtered by the external trap filter. The internal trap filter is engaged by coupling a precision resistor between the pin and a power supply voltage thereby pulling the voltage level of the pin to a logical high voltage level and opening the two path switches to bypass the pin and route the separate luminance signal through an internal trap filter. When the voltage level of the pin is at a logical high voltage level, a bias switch is closed thereby providing a bias current, created from the voltage drop across the precision resistor, to the internal trap filter. The internal trap filter is activated by the bias current and filters the separate luminance signal according to the value of the bias current which is controlled by the value of the precision resistor.

DETAILED DESCRIPTION OF THE PREFERRED EMBODIMENT

Figure 1:
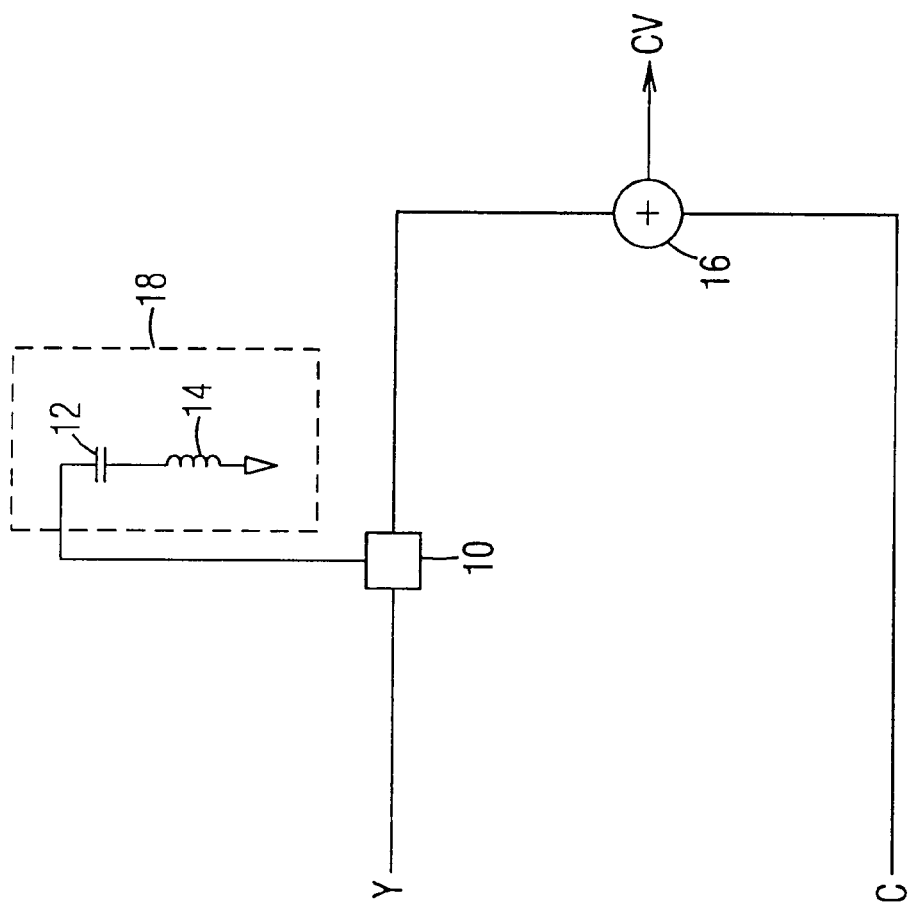
FIG. 1 illustrates an external trap filter according to the prior art.

A method of and apparatus for selectively engaging an internal trap filter and implementing an external trap filter through a single pin routes the separate luminance signal through the pin or through an internal trap filter based on the logical voltage level at the pin. In this manner, a system or circuit designer is provided with the ability to implement an external trap filter as described above. However, if the internal trap filter provided meets the specifications of the system, then the internal trap filter can be engaged by coupling a precision resistor to the pin and providing a bias current to the internal trap filter. When the internal trap filter is engaged, the external LC filter is not necessary and thus a system designer can save on both costs and space of the system. An external precision resistor is less expensive to implement than an external inductor and capacitor. However, if a circuit or system designer desires to implement an external trap filter, the circuit and pin of the present invention can be coupled to an external filter for filtering the separate luminance signal. The single pin within the apparatus of the present invention can therefore be used to both implement an external trap filter and to engage an internal trap filter as appropriate for the specific system. The same pin is also used to provide the bias current for the internal trap filter, when it is engaged.

When implementing an external trap filter the external components comprising the filter are coupled between the pin and ground. The pin is therefore maintained at essentially a logical low voltage level but is allowed to float to any level to follow the luminance signal. It will be undertstood for this disclosure that the pin is coupled to ground through the precision components of the external trap filter and is not driven to a logical low voltage level in the sense of digital circuits. When the pin is at a logical low voltage level, two internal path switches are closed and the separate luminance signal is coupled to the pin to be filtered by the external trap filter.

The internal trap filter is engaged by coupling a precision resistor between the pin and a power supply voltage, thereby pulling the voltage level of the pin to a logical high voltage level and opening the two internal path switches to route the separate luminance signal through an internal trap filter and bypass the pin. It will be understood for purposes of this disclosure that the logical high refers to pulling the pin to a voltage level above a predetermined value. When the voltage level of the pin is at a logical high voltage level, a bias switch is closed, thereby providing a bias current, created from the voltage drop across the precision resistor, to the internal trap filter. The internal trap filter is activated by the bias current and filters the separate luminance signal before it is combined with the separate chrominance signal. The value of the bias current is controlled by the value of the precision resistor. Therefore, by changing the value of the precision resistor, the same internal trap filter can be used with different bias currents to provide different filter frequencies. Accordingly, the internal trap filter can be used to selectively filter frequencies for either NTSC and PAL video signals.

When no external components are coupled to the pin, the pin is not at a logical high voltage level and the internal trap is disabled. When the pin is not at a logical high voltage level, the path switches are closed and the separate luminance signal is routed through the pin. If no external filter is coupled to the pin, the separate luminance signal is passed through the circuit of the present invention with no filtering.

Figure 2:
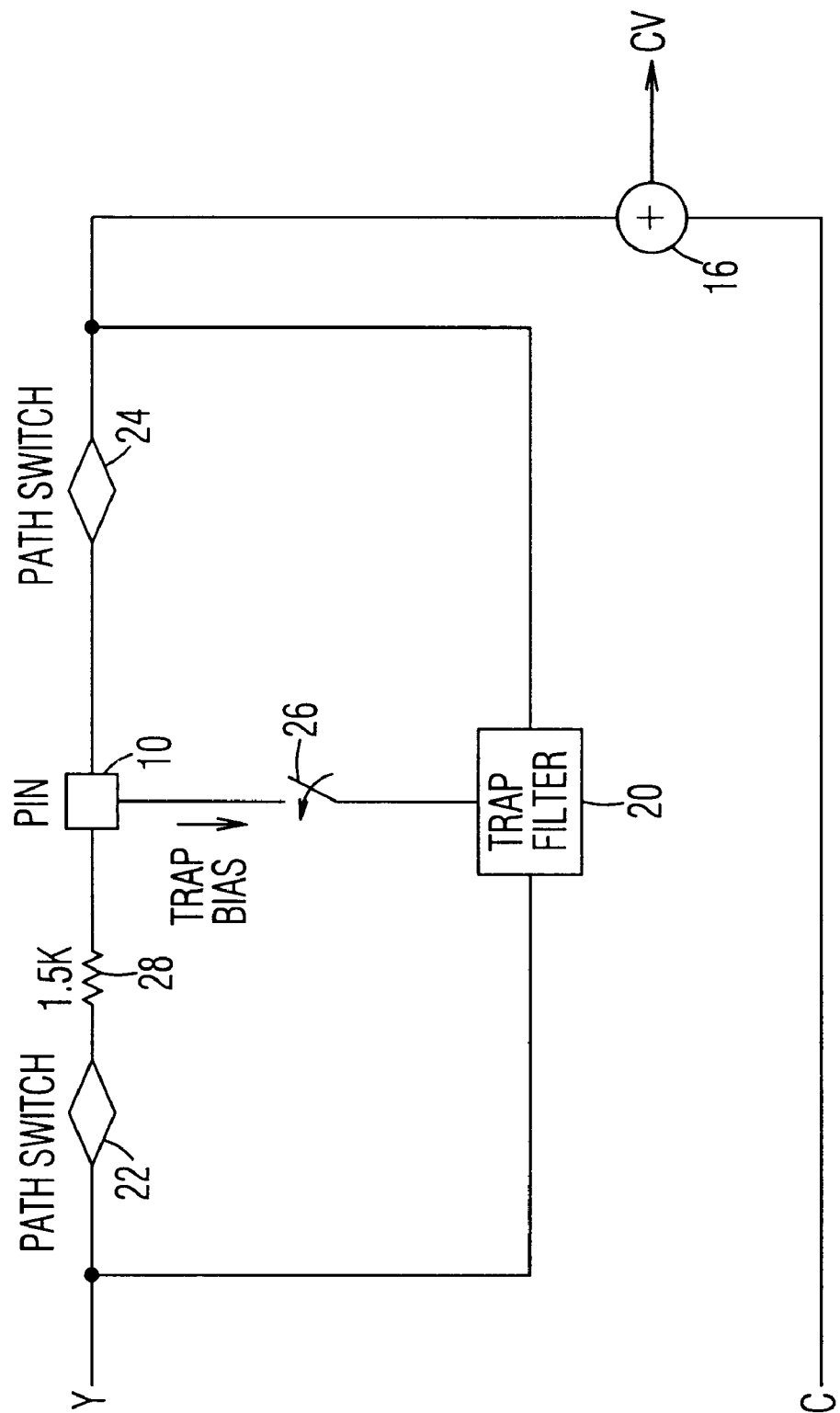
FIG. 2 illustrates a block diagram of the switching mechanisms for engaging the internal trap filter or implementing the external trap filter through the pin 10.

A block diagram of the switching mechanisms for engaging the internal trap filter or implementing the external trap filter through a single pin 10 is illustrated in FIG. 2. The separate luminance signal Y is coupled to a first terminal of a path switch 22 and to an input of a trap filter circuit 20. A second terminal of the path switch 22 is coupled to a first terminal of a resistor 28. A second terminal of the resistor 28 is coupled to the pin 10. The pin 10 is also coupled to a first terminal of a bias switch 26 and to a first terminal of a path switch 24. A second terminal of the path switch 24 is coupled to an output of the trap filter circuit 20 and to a first input of a mixer circuit 16. A second input of the mixer circuit 16 is coupled to receive the separate chrominance signal C. The mixer circuit 16 combines the filtered luminance signal Y with the chrominance signal C and provides a composite video signal CV as an output.

To utilize the internal trap filter, when the pin 10 is coupled to an external power source to bring the pin to a logical high voltage level, both the path switches 22 and 24 are open, thereby routing the separate luminance signal Y through the internal trap filter 20. When the pin 10 is at a logical high voltage level, the bias switch 26 is closed to provide a bias current to the internal trap filter 20, thereby enabling the operation of the internal trap filter 20. In order to engage the internal trap filter 20 and to raise the voltage level of the pin 10 to a logical high voltage level, a precision resistor is coupled between the pin 10 and a voltage source, preferably the supply voltage VCC. The amount of the voltage drop across the precision resistor determines the amount of the bias current which is provided to the internal trap filter 20 through the bias switch 26.

In order to implement an external trap filter, the external components necessary for the external filter are coupled to the pin 10. The external components are also coupled to ground, thereby pulling the pin 10 to a logical low voltage level. When the pin 10 is at a logical low voltage level, the path switches 22 and 24 are closed, thereby routing the separate luminance signal Y, internally to the pin 10, to be filtered by the external trap filter. When the pin 10 is not at a logical high voltage level, the bias switch 26 is open and no biasing current is provided to the internal trap filter 20. The internal trap filter 20 is therefore disabled when the pin 10 is not at a logical high voltage level.

When the pin 10 is not at a logical high voltage level, including the situation when no external components are coupled to the pin 10, both the internal path switches 22 and 24 are closed. The separate luminance signal Y is routed through the path switches 22 and 24. In addition, the bias switch 26 is open so that no bias current is provided to the internal trap filter 20. Accordingly, when there are no external components coupled to the pin 10, the separate luminance signal Y will be passed through the circuit of the present invention without any filtering.

Figure 3:
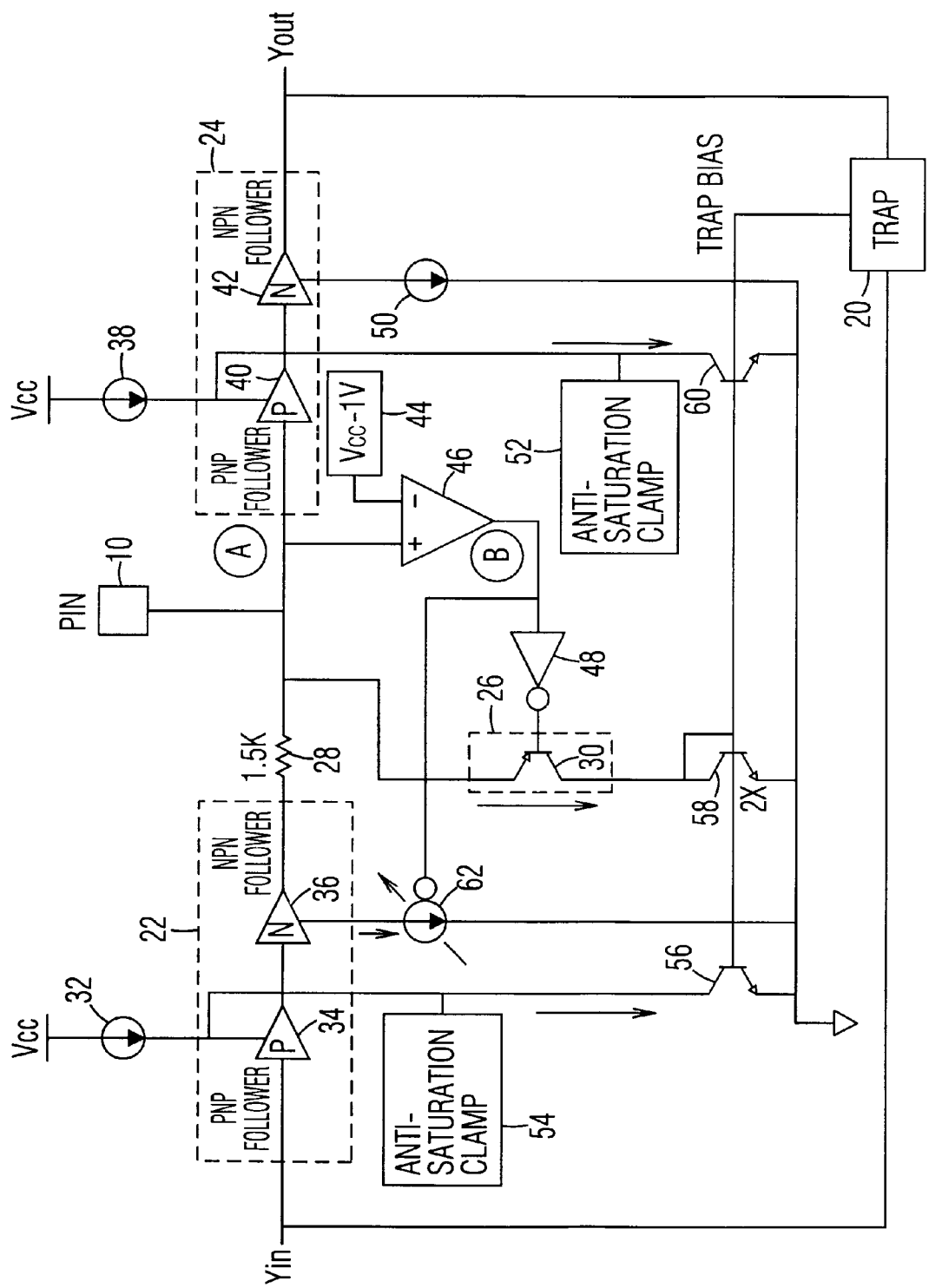
FIG. 3 illustrates a block diagram of the trap switching mechanisms for engaging the internal trap filter or implementing the external trap filter through the pin 10.

A block diagram of the trap switching mechanisms for engaging the internal trap filter or implementing the external trap filter through the single pin 10 is illustrated in FIG. 3. Where appropriate, identical reference numerals will be used as FIG. 2 to show the relationship between the relevant circuit elements. A pnp follower circuit 34 and an npn follower circuit 36 together form the path switch 22. The separate luminance signal $Y_{in}$ is coupled to the pnp follower circuit 34 and to the internal trap filter 20. A first terminal of a current source 32 is coupled to the supply voltage VCC. A second terminal of the current source 32 is coupled to the pnp follower circuit 34 and to a collector of an npn transistor 56. An anti-saturation clamp circuit 54 is also coupled to the collector of the npn transistor 56 for preventing saturation of the circuit. The pnp follower circuit 34 is also coupled to the npn follower circuit 36. The npn follower circuit 36 is coupled to a variable current source 62 which controls the tail current of the npn follower circuit 36. An output terminal of the variable current source 62 is coupled to ground. The npn follower circuit 36 is also coupled to a first terminal of a resistor 28.

A second terminal of the resistor 28 is coupled to the pin 10, to an emitter of a pnp transistor 30, to a positive input of an amplifier 46 and to a pnp follower circuit 40, thereby forming a node A. The pnp follower circuit 40 and an npn follower circuit 42 together form the path switch 24. A first terminal of a current source 38 is coupled to the supply voltage VCC. A second terminal of the current source 38 is coupled to the pnp follower circuit 40 and to a collector of an npn transistor 60. An anti-saturation clamp circuit 52 is also coupled to the collector of the npn transistor 60 for preventing saturation of the circuit. The pnp follower circuit 40 is also coupled to the npn follower circuit 42. The npn follower circuit 42 is coupled to first terminal of a current source 50 for sinking the tail current of the npn follower circuit 42. A second terminal of the current source 50 is coupled to ground. The npn follower circuit 42 is coupled to the internal trap filter 20. Either the npn follower circuit 42 or the internal trap filter 20 will provide the separate luminance signal Y as an output from the circuit of the present invention, depending on the components coupled to the pin 10.

A bias voltage supply 44 having a value equal to the level of the supply voltage VCC minus one volt is coupled to a negative input of the amplifier 46. An output of the amplifier 46 is coupled to an input of an inverter 48 and to a control terminal of the variable current source 62, thereby forming a node B. An output of the inverter 48 is coupled to a base of the pnp transistor 30. The pnp transistor 30 forms the bias switch 26. A collector of the transistor 30 is coupled to a collector and a base of an npn transistor 58. The base of the npn transistor 58 is coupled to a base of the npn transistor 56, to a base of the npn transistor 60 and to provide the bias current to the internal trap filter 20. The emitters of the npn transistors 56, 58 and 60 are all coupled to ground. The emitter of the npn transistor 58 is sized to be twice as big as the emitters of the npn transistors 56 and 60.

Figure 4:
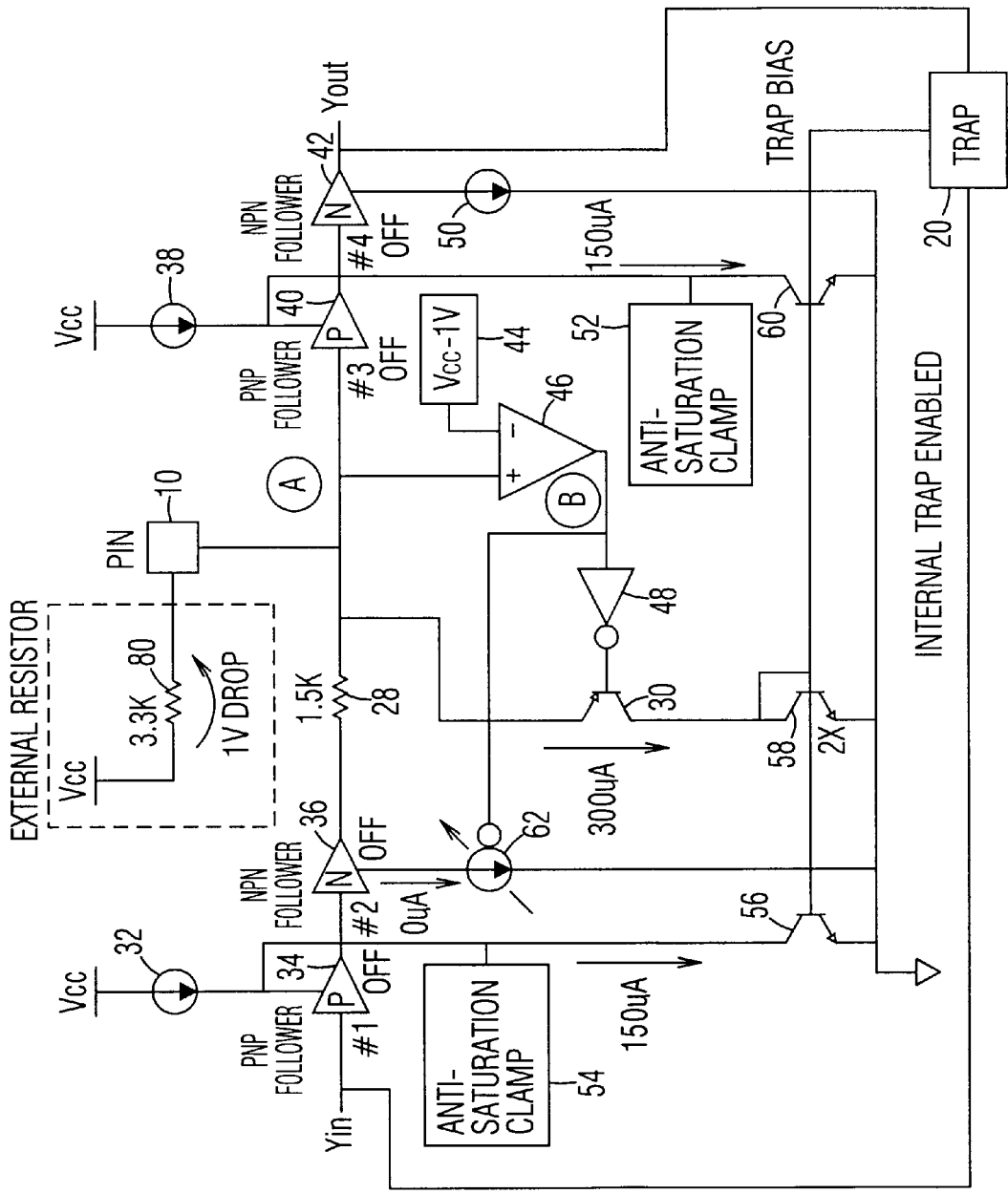
FIG. 4 illustrates the trap switching mechanisms of the present invention with an external precision resistor coupled to the pin 10 and the internal trap filter engaged.

An implementation of the trap switching mechanisms of the present invention with an external precision resistor coupled to the pin 10 and the internal trap filter engaged is illustrated in FIG. 4. Again, identical reference numerals are used as those in the previous figures to show the relationship of relevant circuit elements. In this example, for illustration purposes, a first terminal of an external precision resistor 80 is coupled to the supply voltage VCC. A second terminal of the external precision resistor 80 is coupled to the pin 10. If the pin 10 is coupled to the supply voltage VCC, through the precision resistor 80, then the current generated by the voltage drop across the resistor 80 is used to charge up the node A to a level equal to at least the value of the supply voltage VCC minus one volt. In this configuration, with a precision resistor coupled to the pin 10, the operational amplifier 46 is coupled within a closed loop configuration and therefore the node A will rise to a voltage level equal to at least the level of the bias voltage supply 44.

The circuit of the present invention is designed such that the tail current of the npn follower circuit 36 is less than the current provided by the external precision resistor 80 so that the node A will definitely charge up to at least the operating value of the bias voltage supply 44, when a precision resistor 80 is coupled to the pin 10. When the voltage level at the node A rises up to a level equal to at least the operating value of the bias voltage supply 44, the node B, at the output of the amplifier 46, will rise to a logical high voltage level and completely turn off the variable current source 62. When the variable current source 62 is disabled, the tail current of the npn follower circuit 36 is turned off so that the reference current generated by the external precision resistor 80 will be directed entirely into the reference current mirror circuitry.

When the voltage level at the node B is at a logical high voltage level, the output of the inverter circuit 48 will be at a logical low voltage level, thereby turning the transistor 30 on and causing the bias current from the precision resistor 80 to flow through the transistor 30 and the transistor 58. The current flowing through the transistor 58 is mirrored by current flowing through the transistors 56 and 60, except that the current flowing through the transistors 56 and 60 is only half the value of the current flowing through the transistor 58, due to the size differential of the emitters of the transistors 56, 58 and 60. When the current mirror circuitry becomes active, the mirroring transistors 56 and 60 will turn on and will absorb all of the pnp follower tail current from the current sources 32 and 38 plus more from the anti-saturation clamp circuits 52 and 54, respectively. This turns off the follower pairs (34,36) and (40,42) creating a low impedance path between the center node of each pnp and npn follower pair and ground, thereby opening the path switches 22 and 24 so that the separate luminance signal Y is not passed through the pin 10. This also shunts any crosstalk leaking through the pnp follower circuit from the video signal to ground so that the reference voltage level of the supply voltage VCC minus one volt, on the node A, is not disturbed.

The separate luminance signal Y is therefore routed through and filtered by the internal trap filter 20, essentially bypassing the pin 10. The internal trap filter 20 is provided a precision bias current from the transistors 56, 58 and 60 which enables the operation of the internal trap filter 20 and also controls the corner frequency of the internal trap filter 20. Accordingly, by changing the value of the precision resistor 80, a different corner frequency of the internal trap filter 20 can be implemented.

Figure 5:
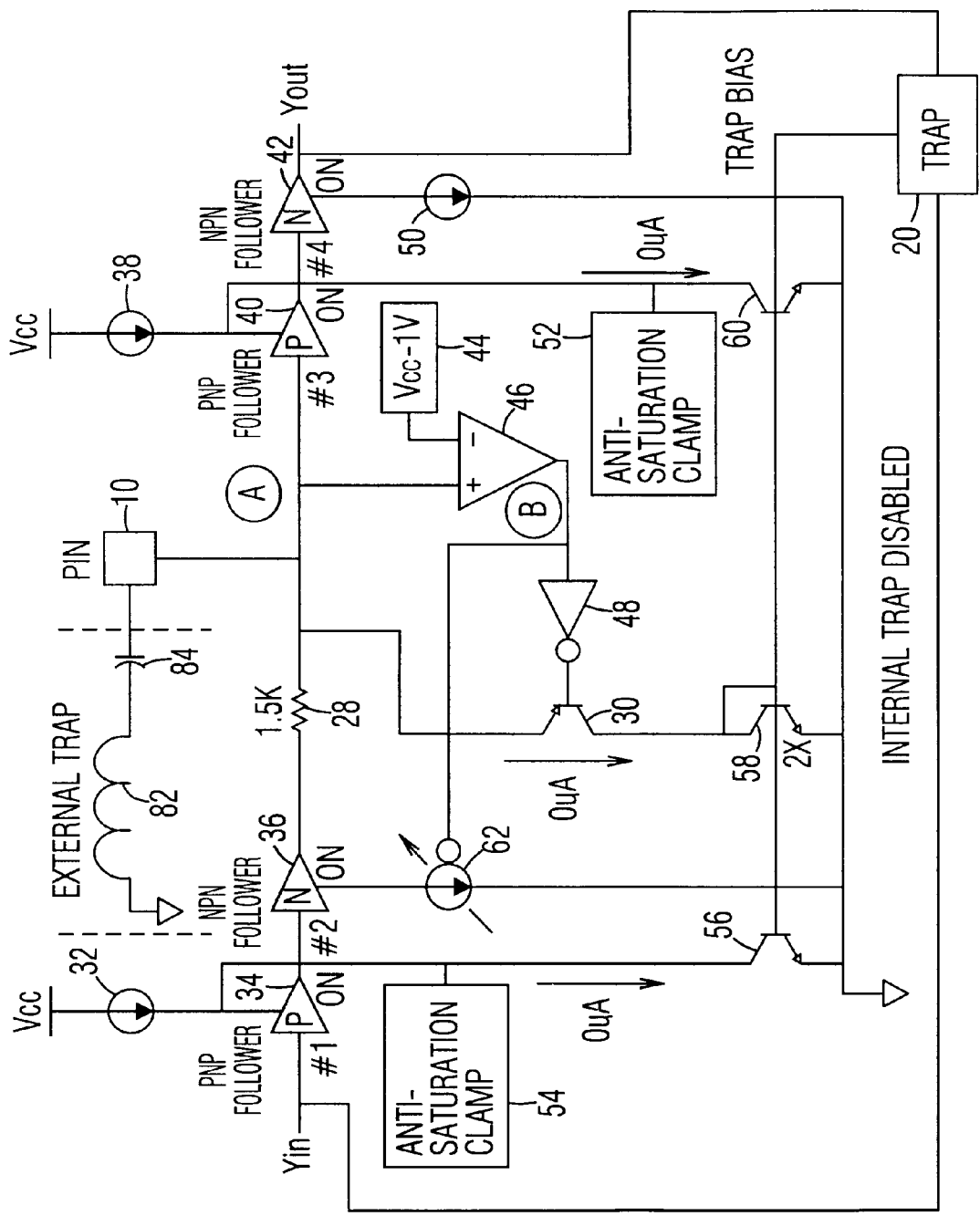
FIG. 5 illustrates the trap switching mechanisms of the present invention with an external LC filter coupled to the pin 10 and the internal trap filter disabled.

An implementation of the trap switching mechanism of the present invention with an external LC trap filter coupled to the pin 10 is illustrated in FIG. 5. In this example, for illustration purposes, a first terminal of an inductor 82 is coupled to ground. A second terminal of the inductor 82 is coupled to a first terminal of a capacitor 84. A second terminal of the capacitor 84 is coupled to the pin 10. Together, the inductor 82 and the capacitor 84 comprise the external LC trap filter. Because, the pin 10 is not coupled to the supply voltage VCC through a resistor, there is no current source which can pull the voltage level of the node A up above the threshold level of the supply voltage VCC minus one volt. Accordingly, when there is no precision resistor coupled to the pin 10, the voltage level at the output of the amplifier 46 and therefore at the node B, is at a logical low voltage level. When the voltage level at the node B is at a logical low voltage level, the variable current source 62 will turn on and the tail current of the npn follower circuit 36 will be active and thus will draw the current from the current source 32, through the pnp follower circuit 34.

Furthermore, when the voltage level at the node B is at a logical low voltage level, the output of the inverter circuit 48 is at a logical high voltage level and will turn the transistor 30 off, thereby opening the bias switch 26, so that no bias current flows through the transistor 30. This causes no current to flow through the transistor 58 and correspondingly, no current will flow through the current mirror transistors 56 and 60. With no bias current and the current mirror transistors turned off, the internal trap filter 20 is turned off and the path switches 22 and 24, formed by the pnp and npn follower pairs (34,36) and (40,42), respectively, are not pulled into an open state and thus remained closed, allowing the separate luminance signal Y to freely pass through the path switches 22 and 24 and the pin 10. As the separate luminance signal Y passes through the pin 10, it is filtered by any external trap filter coupled to the pin 10. As stated above, if no precision resistor or external trap filter is coupled to the pin 10, then the separate luminance signal Y is passed through the path switches 22 and 24 of the circuit of the present invention without any filtering.

Figure 6A:
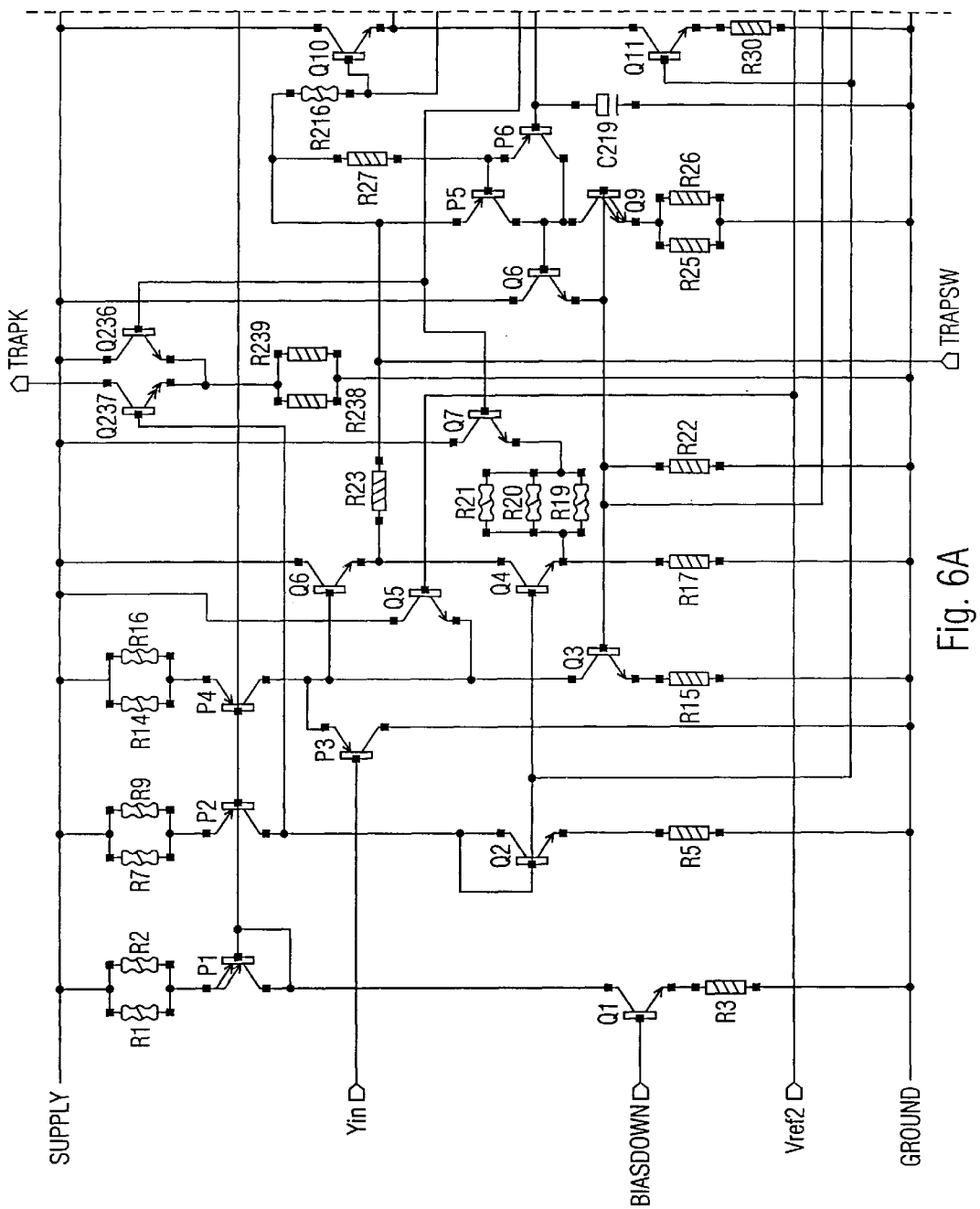
FIG. 6 illustrates a detailed schematic of the trap switching mechanisms of the present invention for engaging the internal trap filter or implementing the external trap filter through the pin 10.
Figure 6B:
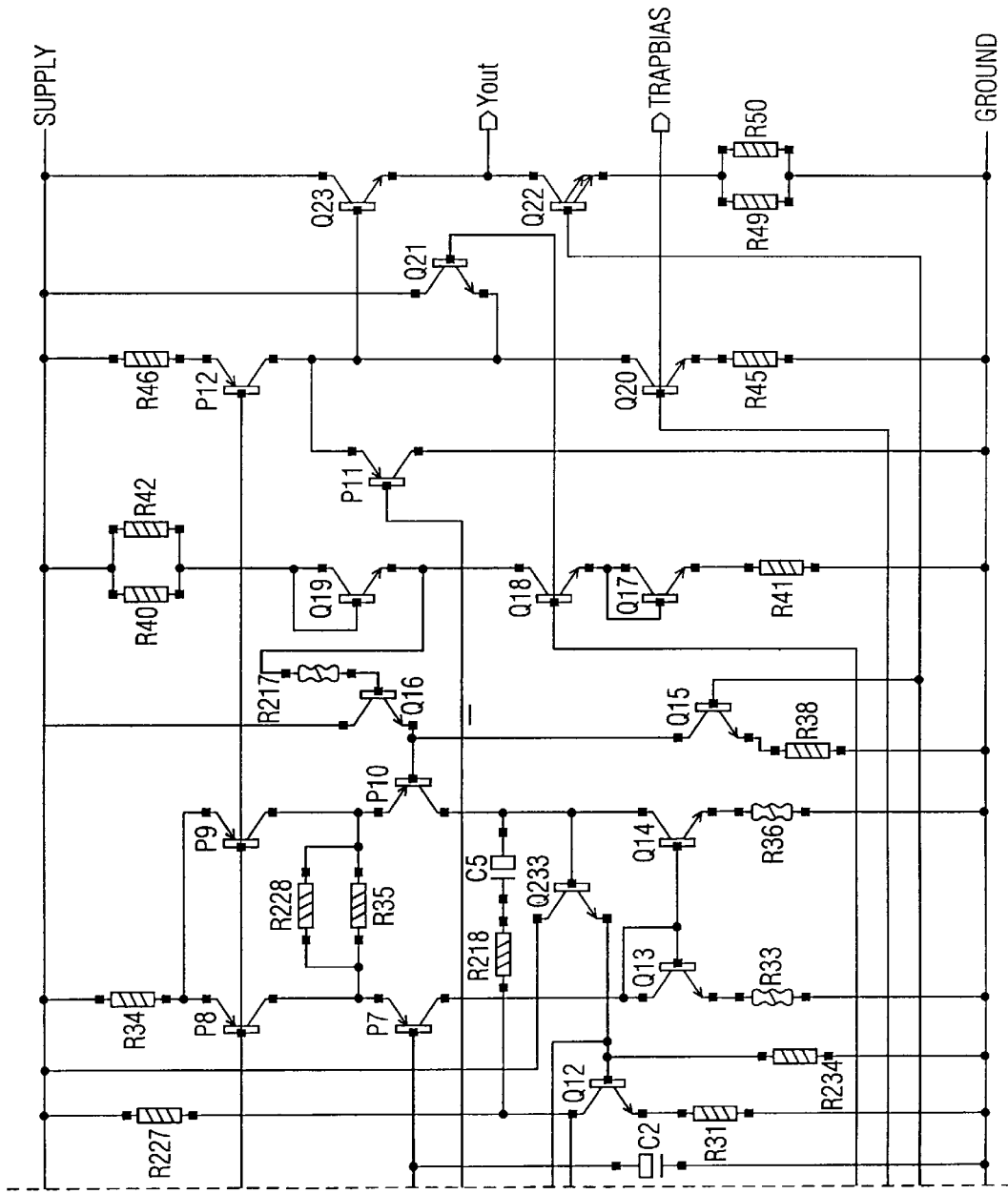

A detailed circuit schematic of the preferred embodiment of the apparatus for selectively engaging an internal trap filter and implementing an external trap filter through a single pin of the present invention is illustrated in FIG. 6. While the preferred embodiment of the present invention has been illustrated and described as an integrated circuit using bipolar transistors, it will be apparent to a person of ordinary skill in the art that the circuit of the present invention may be implemented using another device technology, including but not limited to CMOS, MOS, discrete components and ECL.

A method of and apparatus for selectively engaging an internal trap filter and implementing an external trap filter through a single pin, according to the present invention, routes the separate luminance signal Y to the pin 10 or through the internal trap filter 20 depending on the logical voltage level at the pin 10. If the internal trap filter 20 meets the desired specifications of the system, then the internal trap filter 20 can be engaged by coupling a precision resistor 80 between the pin 10 and the supply voltage VCC, thereby pulling the voltage level at the pin 10 above a threshold value and providing a biasing current to the internal trap filter 20. The internal trap filter 20 is engaged when it receives the biasing current from the voltage drop across the precision resistor 80. Because an external precision resistor is less expensive to implement than an external LC trap filter, when the internal trap filter 20 is engaged, a system designer can save on both costs and space required for the system, because of the elimination of the inductor and capacitor, necessary for an external LC filter.

However, if a system designer desires to implement an external trap filter, the external trap filter is coupled to the same pin 10. The single pin 10, within the apparatus of the present invention, can therefore be used to both implement an external trap filter and to engage an internal trap filter 20, as appropriate for the specific system. The same pin is also used to provide the bias current for the internal trap filter 20, when it is engaged.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

We claim:

1. A method of selectively engaging one of an internal trap filter configured to receive a signal at an input and an external trap filter configured to receive the signal through an input switch at a node, for filtering the signal, the method comprising the steps of:
   a. determining whether a voltage level between the node and a reference voltage is above a predetermined threshold value;
   b. providing a bias current to the internal trap filter when the voltage level is above the threshold value;
   c. routing the signal through the internal trap filter when the voltage level is above the threshold value.

2. The method as claimed in claim 1 further comprising the step of turning on the input switch and routing the signal through the node when the voltage level is below the threshold value.

3. The method as claimed in claim 2 further comprising the steps of coupling the external filter to the node and reducing the voltage level below the threshold value, thereby implementing the external filter for filtering the signal as it is routed through the node.

4. The method as claimed in claim 1 further comprising the step of raising the voltage level above the predetermined threshold value by coupling a resistor between the node and a supply voltage, whereby the voltage level i; increased to a value of the supply voltage less a voltage drop across the resistor.

5. The method as claimed in claim 4 wherein the step of providing the bias current comprises applying the supply voltage to the resistor to produce the bias current flowing through the resistor.

6. The method as claimed in claim 5 wherein a value of the resistor determines a value of the bias current and a corner frequency of the internal trap filter.

7. The method as claimed in claim 6 wherein the node is a single pin on an integrated circuit.

8. The method as claimed in claim 1 wherein the reference voltage is electrical ground.

9. The method as claimed in claim 1 wherein the step of routing the signal further comprises the step of turning off the input switch when the voltage level is above the threshold value.

10. An apparatus for receiving an input signal and selectively filtering the input signal to provide a filtered signal, the apparatus comprising:
   a. a node;
   b. an internal trap filter configured to receive the input signal and to filter the input signal to provide the filtered signal when provided with the input signal and a bias current;
   c. a path switch coupled to the node, to the internal trap filter and configured to receive the input signal for selectively routing the input signal to one of the node and the internal trap filter,
   d. a bias switch coupled to the node and to the internal trap filter and configured for selectively providing the bias current to the internal trap filter;
   e. an output terminal coupled to the internal trap filter and to the node to provide an output signal;
   f. an output switch coupled to the internal trap filter, to the node and to the output terminal to provide a selective one of the input signal and the filtered signal at the output terminal; and
   g. a determining circuit coupled to the node and for controlling the path switch, the output switch and the bias switch for determining when a voltage level between the node and a reference voltage is above a predetermined threshold value, closing the path switch to route the input signal through the node when the voltage level is not above the predetermined threshold value to bypass the internal trap filter and opening the path switch and closing the bias switch to provide the bias current to the internal trap filter and route the input signal through the internal trap filter when the voltage level is above the predetermined threshold value to provide the filtered signal at the output terminal.

11. The apparatus as claimed in claim 10 wherein the node is configured to be coupled to external components for selectively raising and lowering the voltage level.

12. The apparatus as claimed in claim 11 wherein the external components comprise a resistor coupled between the node and a supply voltage and a value of the supply voltage and a value of the resistor are selected to raise the voltage level above the predetermined threshold value, thereby raising the voltage level to the value of the supply voltage less a voltage drop across the resistor.

13. The apparatus as claimed in claim 11 wherein the external components comprise an external filter coupled to the node to reduce the voltage level below the threshold value, thereby implementing the external filter for filtering the input signal as it is routed through the node to provide the filtered signal at the output.

14. The apparatus as claimed in claim 12 wherein a value of the bias current is dependent on the value of the resistor.

15. The apparatus as claimed in claim 14 wherein the node is a single pin on an integrated circuit.

16. The apparatus as claimed in claim 10 wherein the reference voltage is electrical ground.

17. The apparatus as claimed in claim 10 wherein the determining circuit is configured to close the output switch when the voltage is below the threshold value and to open the output switch when the voltage level is above the threshold value.

18. An integrated circuit for receiving an input signal and selectively filtering the input signal to provide a filtered signal, comprising:
   a. an internal trap filter configured for receiving the input signal and filtering the input signal to provide the filtered signal when engaged;
   b. a pin coupled to the internal trap filter;
   c. a path switch coupled to the pin and to the internal trap filter to receive the input signal and selectively route the input signal through the pin and the internal trap filter;
   d. a bias switch coupled between the pin and the internal trap filter for selectively providing a bias current to the internal trap filter;
   e. an output terminal coupled to the pin and to the internal trap filter for providing a selective one of the input signal and the filtered signal as an output signal; and
   f. a determining circuit coupled to the pin and for controlling the path switch and the bias switch for determining when a voltage level between the pin and a reference voltage is above a predetermined threshold value, closing the path switch to route the input signal through the pin when the voltage level is not above the predetermined threshold value and opening the path switch and closing the bias switch to provide the bias current to the internal trap filter and route the input signal through the internal trap filter when the voltage level is above the predetermined threshold value, to provide the filtered signal at the output terminal.

19. The integrated circuit as claimed in claim 18 wherein the pin is configured to be coupled to external components for selectively raising and lowering the voltage level.

20. The integrated circuit as claimed in claim 18 further comprising an output switch coupled to the pin and the output terminal wherein the determining circuit is configured to close the output switch when the voltage is below the threshold value and to open the output switch when the voltage level is above the threshold value.

21. The integrated circuit as claimed in claim 19 wherein a resistor is coupled between the pin and a supply voltage and a value of the resistor and a value of the supply voltage are selected to raise the voltage level above the predetermined threshold value to increase the voltage level to the value of the supply voltage less a voltage drop across the resistor.

22. The integrated circuit as claimed in claim 19 wherein an external filter is coupled between the pin and the reference point, thereby reducing, the voltage level below the predetermined threshold value and selectively implementing the external filter for filtering the input signal as it is routed through the pin to provide the filtered signal at the output.

23. The integrated circuit as claimed in claim 21 wherein a value of the bias current is dependent on the value of the resistor.

24. The integrated circuit as claimed in claim 22 wherein the reference voltage is electrical ground.

25. An apparatus configured for receiving an input signal and selectively filtering the input signal to provide a filtered signal, the apparatus comprising:
   a. an internal trap filter which is configured for receiving the input signal and filtering the input signal to provide the filtered signal when engaged;
   b. a node coupled to the internal trap filter and configured to be coupled to external components, including a resistor and an external trap filter for selectively raising and lowering a voltage level between the node and a reference voltage, wherein the resistor is coupled between the node and a supply voltage to raise the voltage level above a predetermined threshold value and further wherein the external filter is coupled between the node and the reference voltage to maintain the voltage level below the predetermined threshold value;
   c. an output terminal coupled to the internal trap filter and to the node;
   d. a first path switch coupled to the nodes to the internal trap filter and to receive the input signal, wherein the first path switch is configured for selective y routing the input signal through the node when the voltage level is below the predetermined threshold value and through the internal trap filter when the voltage level is above the predetermined threshold value;
   e. a second path switch coupled to the node and to the output terminal, wherein the second path switch is configured for selectively routing the filtered signal from one of the internal trap filter and the external filter to the output terminal;
   f. a bias switch coupled between the node and the internal trap filter for providing the bias current to the internal trap filter when the voltage level is above the predetermined threshold value; and
   h. a controlling circuit coupled to the node and for controlling the first and second path switches and the bias switch for closing the first and second path switches to route the input signal to the node when the voltage level is not above the predetermined threshold value whereby the external filter is selectively engaged for filtering the input signal as it is routed through the node to provide the filtered signal to the output terminal and opening the first and second path switches and closing the bias switch to provide the bias current to the internal trap filter and route the input signal through the internal trap filter when the voltage level is above the predetermined threshold value whereby the internal trap filter is engaged to filter the input signal to provide the filtered signal to the output terminal.

26. The apparatus as claimed in claim 25 wherein the reference voltage is electrical ground.

27. The apparatus as claimed in claim 25 wherein the bias current is provided by current flowing from the supply voltage through the resistor and further wherein a value of the bias current is dependent on a value of the resistor.

28. The apparatus as claimed in claim 27 wherein the node is a single pin on an integrated circuit.

* * * * *

UNITED STATES PATENT AND TRADEMARK OFFICE
CERTIFICATE OF CORRECTION

PATENT NO. : 5,926,063

DATED : July 20, 1999

INVENTOR(S) : Mehrdad Nayebi *et al.*

It is certified that error appears in the above-identified patent and that said Letters Patent is hereby correct as shown below:

In column 7, line 65, delete "i;" and insert --is--.
In column 8, line 27, delete "filter," and insert --filter;--.
In column 9, line 58, delete "reducing," and insert --reducing--.
In column 10, line 26, delete "selective y" and insert --selectively--.

Signed and Sealed this

Twenty-ninth Day of February, 2000

Attest:

Q. TODD DICKINSON

*Attesting Officer*  *Commissioner of Patents and Trademarks*